Patented Jan. 12, 1954

2,666,082

UNITED STATES PATENT OFFICE 2,666,082

ARYLETHERS OF GLYCEROL BIS-CHLORALHEMIACETAL

John V. Scudi, New York, and Leon E. Tenenbaum, Brooklyn, N. Y., assignors to Nepera Chemical Co. Inc., Yonkers, N. Y., a corporation of New York No Drawing. Application December 27, 1951,
Serial No. 263,699

6 Claims. (Cl. 260—613)

This invention relates to new derivatives of glycerol and particularly relates to arylethers of glycerol bis-chloralhemiacetal. Our new compounds are very useful therapeutic agents, since they have strong sedative properties and they do not belong in the class of barbiturate type compounds. They are useful in the treatment of insomnia and anxiety states and other conditions requiring depression of the central nervous system.

It is known that chloral forms condensation products, without the loss of water, with polyhydric alcohols. Thus, when glycerol and chloral are mixed together $a,\beta$-di-($\beta'$-trichloro-$a'$-hydroxyethoxy)-$\gamma$-hydroxypropane is formed.

We have found that, when we react mono-arylethers of glycerol with chloral a similar reaction will occur. The reaction may be illustrated by the following equation:

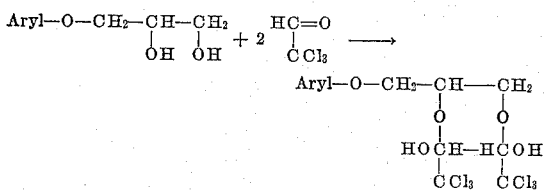

in which formula aryl represents a phenyl radical, which may be further substituted in one or more positions with various groups such as alkyl containing 1–3 carbon atoms, hydroxy, alkoxy containing 1–3 carbon atoms, amino, alkylamino, acetamino, nitro groups or halogen. While these substitutions do not change the chemical reaction to any considerable degree, we have found that they do influence the physiological properties.

The objects of this invention include the preparation of aromatic ethers of glycerol-bis-chloralhemiacetals, which have various desired physiological properties.

In carrying out our invention, we prepare the mono-arylethers of glycerol by the usual method, that is, we react the sodium salt of phenol, or the sodium salts of substituted phenols, with 3-chloro-1,2-propanediol ($a$-chlorohydrin), and isolate and purify the product. We then dissolve the arylether in benzene, toluene or other anhydrous, non-polar solvent and add chloral in a slight excess. After standing overnight, we collect the crystalline bis-hemiacetal formed and purify it by recrystallization.

The new products occur as white crystalline powders. They are soluble in acetone, alcohol, ether, propylene-glycol, chloroform, benzene, slightly in cold, more so in hot toluene and hexane. They are insoluble in water.

The following are several illustrative examples of some of the preferred procedures of carrying out our invention, which are given for illustration and not for limitation:

Example 1

A solution of 182 grams (1 mol) of 1-(o-methylphenoxy)-2,3-dihydroxy propane and 367 grams (2.5 mols) of chloral in 500 ml. of toluene was prepared and stirred for two and one half hours. The solution warmed up immediately after preparation and reached a temperature of 50–60° C. It was allowed to stand overnight at room temperature. A white precipitate formed, which was separated and then recrystallized from hot toluene. The product 1-(o-methylphenoxy)-2,3 - bis (2,2,2-trichloro-1-hydroxyethoxy) propane, $C_{14}H_{16}O_5Cl_6$ melts at 103–106° C. In an analysis there was found: C=35.67%, theory=35.24%; H=3.49%, theory=3.38%; Cl=44.4%, theory=44.6%.

Example 2

To a solution of 76 grams of 1-phenoxy-2,3-dihydroxy propane in 200 ml. of toluene, 166 grams of chloral were added under continuous stirring. The reaction mixture warmed up, then it was cooled to, and kept at, room temperature overnight. The toluene and excess chloral was removed by distillation and the residue extracted with hot hexane from which, after cooling, the crystalline precipitate was collected and purified by recrystallization. The product 1-phenoxy-2,3-bis (2,2,2-trichloro-,1-hydroxy-ethoxy) propane, $C_{13}H_{14}O_5Cl_6$ melts at 94–96° C. In an analysis, there was found Cl=46.4%, theory 45.9%.

Example 3

To a solution of 124 grams of 1-(p-chlorophenoxy)-2,3-dihydroxy propane in 250 ml. of toluene, 237 grams of chloral were added. The reaction mixture was worked up as in Example 2. The resulting product of 1-(p-chlorophenoxy)-,2,3-bis(2,2,2-trichloro-,1-hydroxy - ethoxy) propane, $C_{13}H_{13}O_5Cl_7$ melts at 96–98° C. In an analysis there was found Cl=49.5%, theory 49.9%.

In the same way, by reacting chloral with 1-(p-methoxyphenoxy)-,2,3-dihydroxy propane we obtain 1-(p-methoxyphenoxy)-2,3-bis (2,2,2-trichloro-1-hydroxyethoxy) propane; by reacting chloral with 1-(p-aminophenoxy)-,2,3-dihydroxy propane we obtain 1-(p-aminophenoxy)-2,3-bis (2,2,2-trichloro-1-hydroxyethoxy) propane; and by reacting chloral with 1-(p-nitrophenoxy)-, 2,3-dihydroxy propane we obtain 1-(p-nitrophenoxy) - 2,3 - bis (2,2,2 - trichloro-1-hydroxyethoxy) propane.

Each of the products obtained in the above examples is a non-barbiturate compound having strong sedative properties. They are of very low toxicity and, although taking effect more rapidly than do the barbiturates, the duration of the sedative action is comparable to that of a moderately long-acting barbiturate. Each can, therefore, be used in the treatment of insomnia and anxiety states without the disadvantages appertaining the the use of barbiturates.

We do not limit ourselves to the specific examples mentioned, as these are given solely for the purpose of clearly describing our invention as set forth herewith.

What we claim is:

1. Aryl ethers of glycerol bis-chloralhemiacetal of the following general formula:

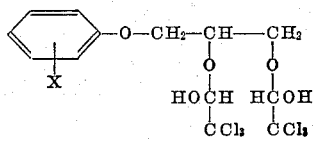

in which X represents a member of a group consisting of hydrogen, alkyl and alkoxy radicals containing 1–3 carbon atoms, amino and nitro radicals and halogen.

2. The new compound 1 - phenoxy - 2,3 - bis-(2,2,2-trichloro-1-hydroxyethoxy) propane.

3. The new compound 1-(o-methyl phenoxy)-2,3-bis (2,2,2-trichloro-1-hydroxyethoxy) propane.

4. The new compound 1-(p-methoxyphenoxy)-2,3-bis (2,2,2-trichloro-1-hydroxyethoxy) propane.

5. The new compound 1-(p-nitrophenoxy)-2,3-bis (2,2,2-trichloro-1-hydroxyethoxy) propane.

6. The new compound 1-(p-chlorophenoxy)-2,3-bis (2,2,2-trichloro-1-hydroxyethoxy) propane.

JOHN V. SCUDI.
LEON E. TENENBAUM.

References Cited in the file of this patent

UNITED STATES PATENTS

| Number | Name | Date |
|---|---|---|
| 2,502,355 | Usteri et al. | Mar. 28, 1950 |
| 2,637,676 | Mikeska | May 5, 1953 |